United States Patent [19]

Baxter et al.

[11] Patent Number: 4,771,799

[45] Date of Patent: Sep. 20, 1988

[54] METHOD FOR IMPROVING THE PERFORMANCE OF HIGHLY VISCOUS CONCENTRATES OF HIGH MOLECULAR WEIGHT DRAG REDUCING POLYMERS

[75] Inventors: Steven L. Baxter, Ponca City, Okla.; Max H. Lewis, Waverly, Tenn.

[73] Assignee: Conoco Inc., Ponca City, Okla.

[21] Appl. No.: 114,313

[22] Filed: Oct. 29, 1987

[51] Int. Cl.$^4$ .................................................. F17D 1/16
[52] U.S. Cl. .................................................. 137/13
[58] Field of Search ....................................... 137/13

[56] References Cited

U.S. PATENT DOCUMENTS

| | | | |
|---|---|---|---|
| 3,601,079 | 8/1971 | Giles | 137/13 X |
| 3,736,288 | 5/1973 | Stratta | 137/13 X |
| 3,826,279 | 7/1974 | Vershuur | 137/13 X |
| 3,827,447 | 8/1974 | Meier | 137/13 |
| 3,891,593 | 6/1975 | Smitherman | 137/13 X |
| 4,263,926 | 4/1981 | Drake | 137/13 |
| 4,340,076 | 7/1982 | Weitzen | 137/13 |

Primary Examiner—Alan Cohan
Attorney, Agent, or Firm—C. R. Schupbach

[57] ABSTRACT

High molecular weight viscoelastic polymers are dissolved by passing the polymer solution through a die which "beads" the polymer allowing the formation of very fine filaments which are drawn into the flow. The beading and flow rate are balanced to maintain constant fine filament formation.

8 Claims, 3 Drawing Sheets

TYPICAL PERFORMANCE PROFILE
% DRAG REDUCTION VS. SEGMENT

METHOD FOR IMPROVING THE PERFORMANCE OF HIGHLY VISCOUS CONCENTRATES OF HIGH MOLECULAR WEIGHT DRAG REDUCING POLYMERS

The present invention is directed to means for improving the flow of fluids through conduits. More specifically, the present invention is directed to a means for improving the flow of fluids through conduits through the use of a method for introducing a drag reducing polymer to the flowing fluid in a manner which increases the effectiveness of the drag reducing polymer and provides a large reduction in flowing fluid friction within the conduit.

REFERENCE TO RELATED APPLICATIONS

The present invention is related in purpose to U.S. patent application Ser. No. 073,664, filed on July 13, 1987 and U.S. patent application Ser. No. 073,663, filed on July 13, 1987.

This invention is an improvement over those related applications. The present invention avoids many of the problems of the previous applications and provides yet more improved drag reduction performance by the polymer concentrates.

Drag reduction of hydrocarbon fluids flowing through conduits is known. An example of such work is described in U.S. Pat. No. 3,629,676 which provides a method by which percent drag reduction can be measured. The reference describes inserting the drag reducing additives as a polymeric liquid. Other representative but non-exhaustive art in the area includes U.S. Pat. No. 3,736,288 in which various drag reducing formulations are added to exhibit a staggered dissolving or controlled dissolving characteristic using varying molecular weight fractions and/or particle sizes. These materials are added as polymeric solids. The reference also discloses pumpability, pourability, stratification resistance and the like of these solutions. U.S. Pat. No. 3,601,079 describes a water-soluble, polymeric material mixed with water in a mixing chamber prior to injection into a pipeline. U.S. Pat. No. 3,884,252 describes a process for reducing oxidative degradation and cold flow of polymer crumb by immersing the crumb in a non-solvent and then dusting prior to injecting the polymer crumb or slurry of polymer crumb and water into a hydrocarbon fluid and allowing the crumb to gradually and continuously dissolve throughout the pipeline. Injection of friction reducing polymers is also described in U.S. Pat. No. 4,263,926. A drag reducing dispersing metering system is described in U.S. Pat. No. 3,900,034.

There also exists a group of art relating to a method for dissolving polymers in solvent. This art does not specifically mention pipelining of fluids. This area of art is non-exhaustive represented by U.S. Pat. Nos. 2,639,275; 3,468,322; 3,891,593 and 4,537,513. These patents all deal with methods for dissolving a fixed amount of polymer in a fixed amount of solvent, utilizing recycling or dissolving means. However, such methods of dissolving polymer require extra apparatus and it would be highly preferable to directly inject drag reducing agents into a pipeline.

It is therefore an object of the present invention to provide an improved method for the introduction of drag reducing agents into conduits containing flowing liquids in order to increase the drag reducing effectiveness of such additives. The present invention is useful for both aqueous liquid and hydrocarbon liquid pipelines and can be used for injection of either water-soluble or hydrocarbon-soluble drag reducing additives. Such additives are normally polymers soluble in the flowing liquid. Other objects will become apparent to those skilled in this art as the description proceeds.

The performance of drag reducing additives is highly dependent upon the dissolution of these additives in the flowing liquid. Addition of solid materials to a pipeline and allowing dissolution as the material travels to the pipeline has not been found to be an effective means of promoting drag reduction, since the materials are not dissolved at the time during which they are needed to provide drag reducing effects. It has been found preferable to inject the materials in a dissolved state or in a highly viscous concentrate in order to promote drag reduction by the dissolution of the polymer.

However, it has also been found that extremely high molecular weights greatly enhance the drag reduction effects of the injected polymer. Conversely, as molecular weight increases it was also found that dissolution time alone is not the only factor in drag reduction performance.

U.S. Pat. No. 4,422,830 teaches that pump performance is enhanced when pumping a viscous chemical liquid by simultaneously pumping a compatible low viscosity liquid into the suction side of the injection pump. The low viscosity liquid acts as a lubricant and also assists in the dissolution or dispersion of the additive in the fluid flowing through a pipeline.

However, the cross-referenced co-pending application Ser. Nos. 073,663 and 073,664 found that simple dissolution characteristics as evidenced by surface area are not the only criteria. It is also necessary for the materials to be entrained in the flowing fluid in a particular manner.

It would therefore be of great benefit to provide a method whereby high molecular weight drag reducing polymers can be introduced into fluids flowing through conduits in a manner to increase the performance of the drag reducing material where objects will become apparent to those skilled in this art as the description proceeds.

We have now discovered that effectiveness of a drag reducing polymer in reducing the friction loss of flowing liquids through conduits can be increased by injecting a drag reducing polymer solution or concentrate through multiple orifices no larger than 2 millimeters in the largest dimension and allowing the flowing liquid moving past the extruded polymer to dissolve said polymer wherein the injection rate is such that substantially no reagglomeration occurs on the flowing liquid conduit side of the orifices prior to dissolution by the flowing liquid and such that the polymer concentrate forms very small filaments of diameters less than 2 millimeters and length of generally less than about 10 meters prior to dissolution. The method is effective for either hydrocarbon-soluble polymers in hydrocarbon liquids or water-soluble polymers in aqueous liquids.

The present invention is an improvement over other techniques used to dissolve such polymers, such as pipeline drag reducing additives and jet fuel anti-misting additives, in that no strand of diameter greater than about 1 to 2 millimeters exists at distances more than a few inches away from the exit or conduit side of the nozzle. Generally, dissolution is complete in about 10 meters or less. Conventional dissolution methods generate a strand of polymer concentrate (or multiple strands if duplicate nozzles or multiple perforation nozzles are used) which stretches to great lengths in the flowing fluid. Some drag reduction studies in transparent pipe have demonstrated that strands of polymer concentrate exist as much as 500 feet downstream of the injection point. These conventional injection strands may eventually taper down to a diameter similar to that initially introduced by the filaments of the present invention. However, the present invention is distinguished from the prior art in that very small nodules of drag reducing polymer solution can be picked up by the flowing fluid and rapidly stretched and rapidly dissolved to thread of spider web size. All other injection systems known have used the method of establishing a stable injected strand of at least several millimeters in diameter, but more importantly, of extremely long length sometimes extending up to a mile or more. If this extended strand breaks, detaches itself or breaks free from the injection nozzle prematurely, a serious dissolution problem occurs in that the strand recoils upon itself and forms a lump which inhibits dissolution. Because of such breakage, injection points have had to be carefully selected to avoid pipeline bends, converging flows, or other mechanical factors that might break the strand. In contrast, in the present invention, the stable strands are not established within the system. Dissolution is achieved on a very much shorter length distance scale and within a much shorter time. Mechanical characteristics of the system such as bends, tees, pumps and the like are largely reduced in effect. Therefore one of the most characteristic features of the present invention is the very small diameter involved. The formation of very fine filaments and the complete dissolution of the polymer in a very short distance is critical to the present invention.

BRIEF DESCRIPTION OF THE DRAWINGS:

FIG. 2 shows percent drag reduction at 100 parts per million polymer using different means of injection.

Figure 1:
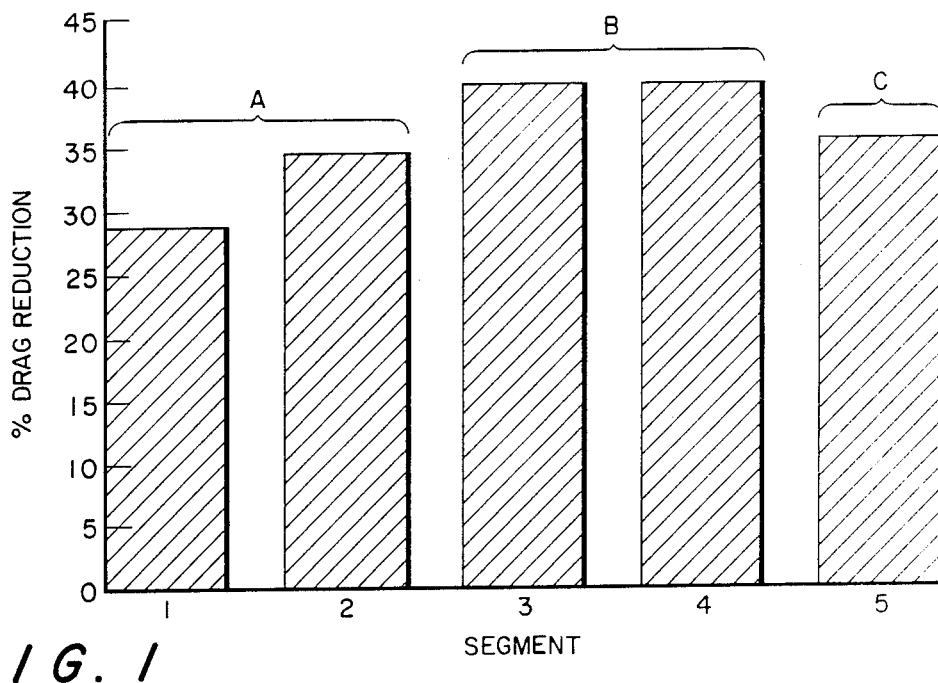
FIGS. 1 and 2 show typical performance profiles of drag reduction in certain testloop segments in a drag reduction test apparatus.

DETAILED DESCRIPTION OF THE DRAWINGS:

FIG. 1 illustrates experimental information produced in Example 1, in which Region A is dominated by dissolution while Region B shows dissolution rate and Region C degradation rate.

Figure 2:
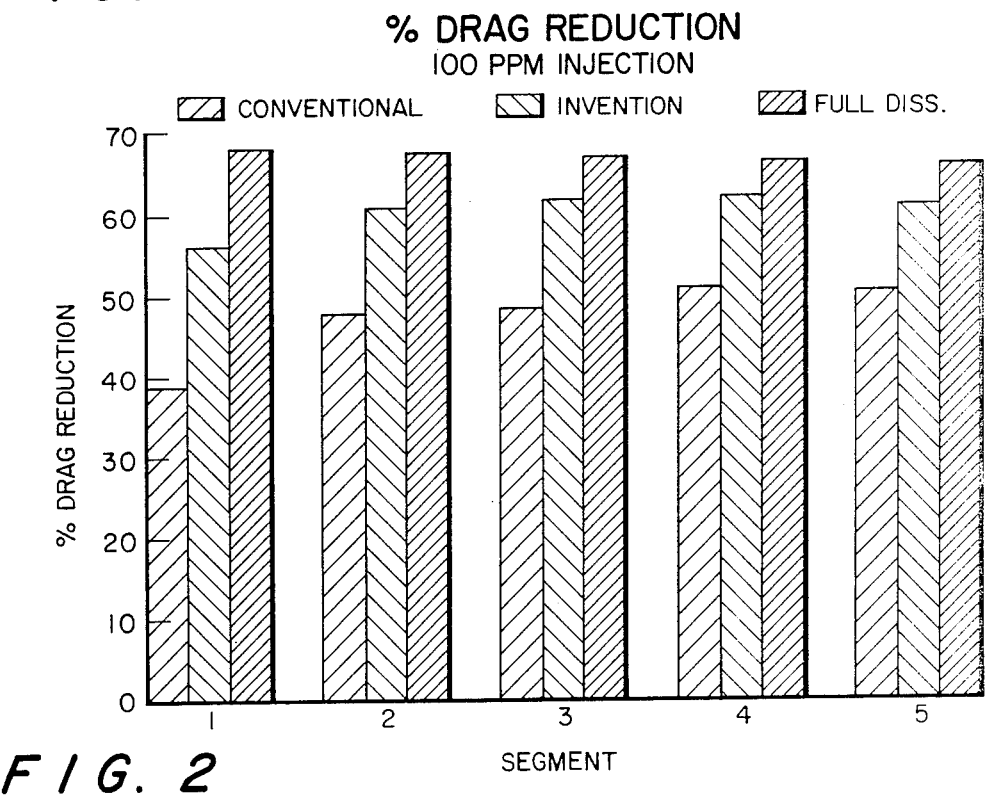
Figure 3:
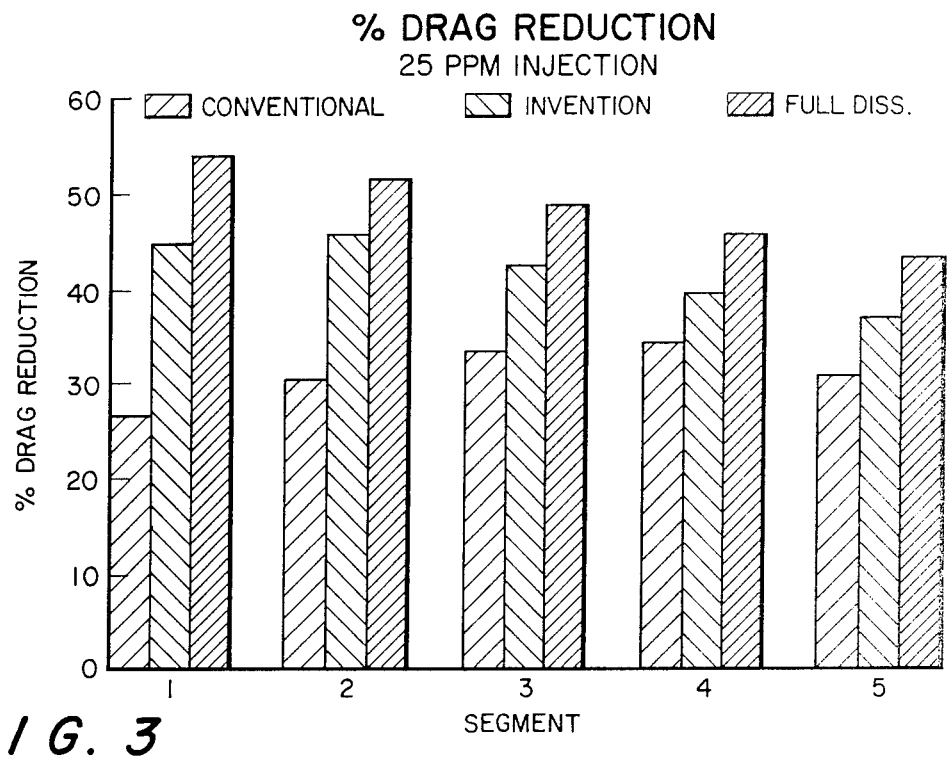
FIG. 3 shows results for different injection means at 25 parts per million injection.

FIGS. 2 and 3 graphically illustrate the data from Table 1 of Example 2. FIG. 2 shows comparative data for a relatively high treatment level of 100 parts per million (ppm) polymer. The bars labeled "Full Diss" show the drag reduction expected under fully dissolved conditions. The bars labeled "Conventional" show the actual drag reduction obtained using a conventional polymer injection device. The difference between these two bars is related to the amount of undissolved, and therefore under-utilized, polymer. The bar labeled "Invention" demonstrates the higher drag reduction achieved with the more complete dissolution of the present invention. A set of bars is shown for each of the five sequential segments through which the treated hydrocarbon passes as it flows through the test loop. The difference in performance from segment to segment is representative of the effectiveness of the polymer addition techniques. The figure shows that more complete dissolution and faster dissolution of the injected polymer solution can be achieved with the present invention.

FIG. 3 shows the same type of information as FIG. 2 when the comparative test is performed at a lower treatment level of 26 parts per million. The data again demonstrates that more complete dissolution and faster dissolution is achieved with the present invention.

Figure 4:
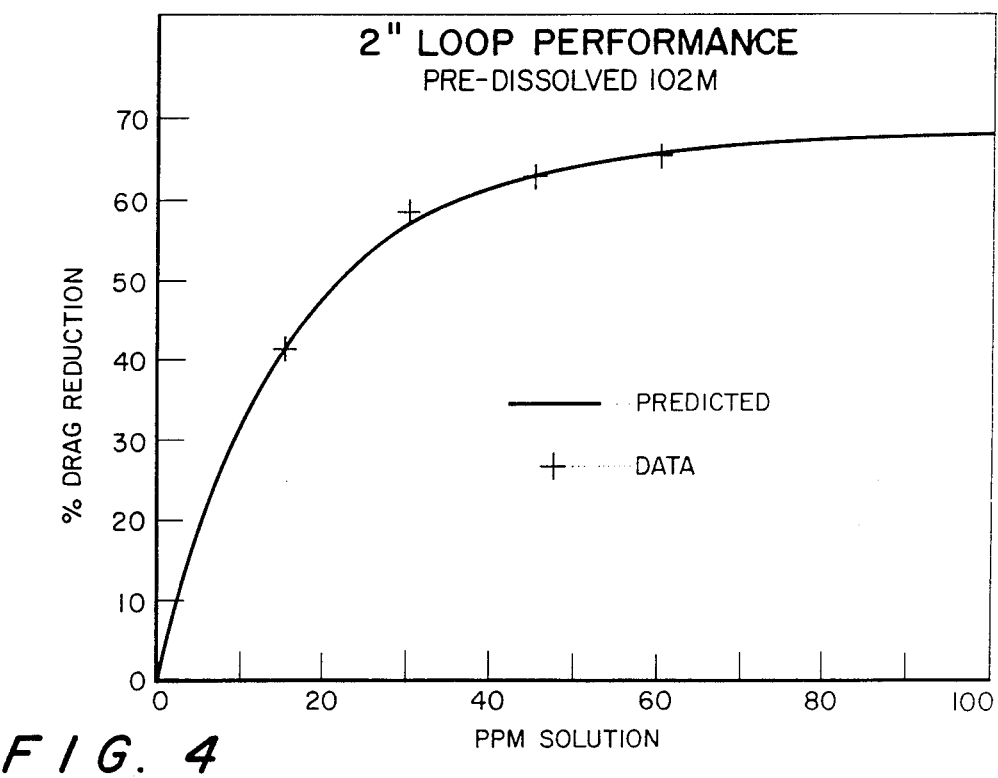
FIG. 4 shows 2 inch loop performance using pre-dissolved drag reducing polymer.

FIG. 4 shows the correlation and the very strong saturating effect of the polymer at higher treatment levels. Four actual data points obtained are shown. The Figure superimposes these data points over a predicted performance curve obtained by statistical extrapolation.

Figure 5:
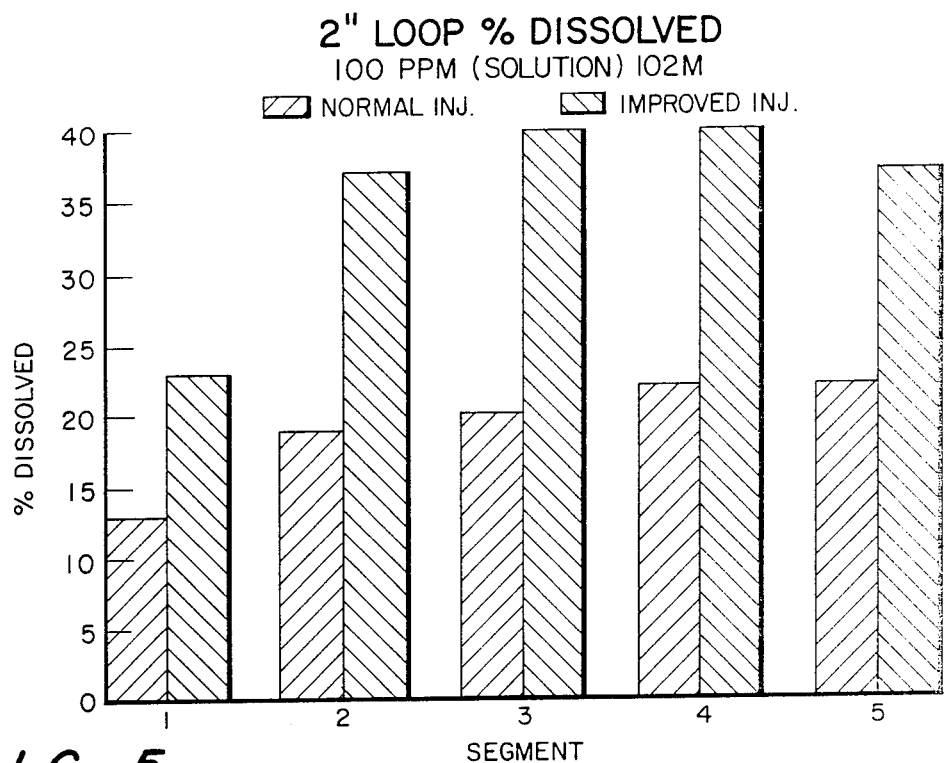
FIGS. 5 and 6 show 2 inch loop percentage of polymer dissolved under conditions of 100 parts per million solution and 26 parts per million solution respectively.
Figure 6:
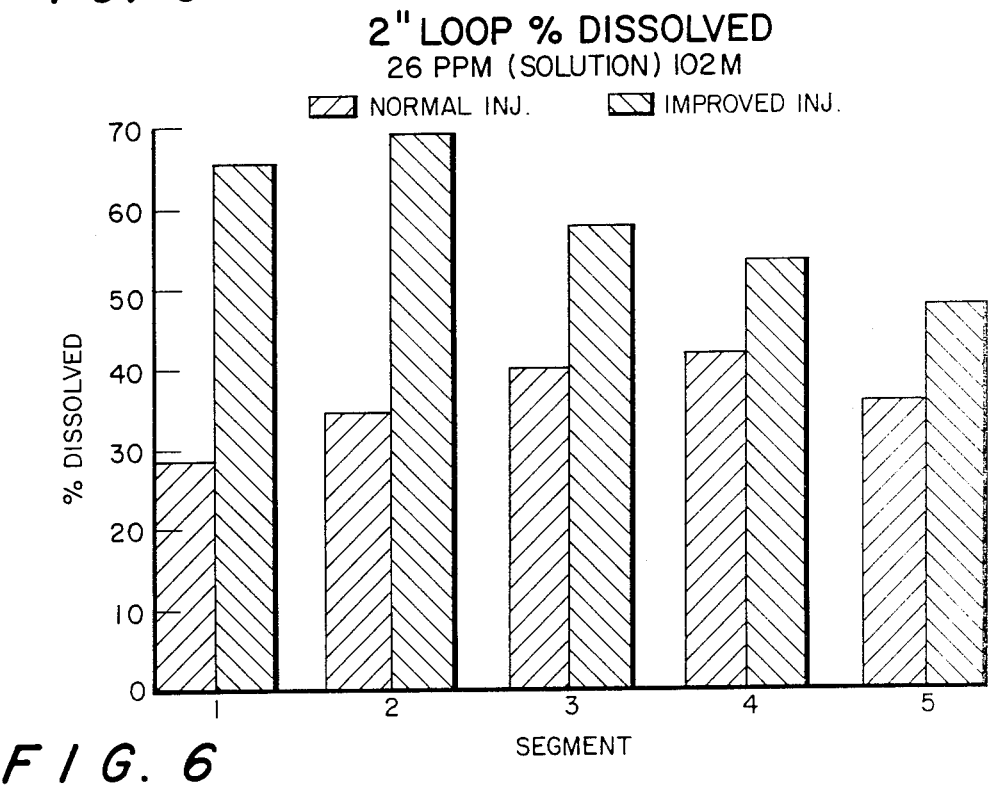

FIGS. 5 and 6 show the correlation between drag reduction performance as observed in the test loop and actual concentration of dissolved polymer. These calculations are tabulated in Table 2. FIG. 5 relates to a 100 ppm treatment level, while FIG. 6 shows the same information at a 26 ppm treatment level.

In order to be effective in the present invention, several conditions must be present. The concentrate must be viscoelastic and capable of forming very fine filaments which can be drawn for distances of several inches. A dissolving fluid must either be flowing past the surface of the injection device or must be agitated such that a flow of material is maintained across the surface of the nozzle. The invention can therefore be used in either a continuous or a batch dissolution process. However it is important that the injected materials not reagglomerate on the fluid side of the nozzle.

Nozzles used in the present invention are not critical other than no opening be greater than 2 millimeter in its greatest dimension and that the nozzle is designed such that the polymer concentrate beads into the moving liquid in numerous spots on the exit side of the nozzle. An example of a suitable nozzle used to generate the data of the present invention is simply a pipe with a permanently mounted fine mesh screen capping the end. The addition rate of the concentrate to the pipeline must be adjusted to allow the filaments to be drawn into the flow. If excessive addition rates are used, then the concentrate simply reagglomerates on the exit side of the nozzle and the desired effect is not obtained. If higher levels of addition are desired, then it is important that larger nozzles or multiple nozzles be used to provide the necessary filament formation in the flowing liquid in order to achieve the effectiveness of the present invention.

Utilizing the present invention for the reduction of drag in hydrocarbon-containing fluids, it is preferred but not critical that the drag reducing polymer be substantially an alphaolefin polymer having an inherent viscosity of at least 11 deciliters per gram. Inherent viscosity is an indirect measurement of molecular weight and can be determined using a Cannon-Ubbelhde 4 bulb shear dilution viscometer, size 75. Samples are prepared at 0.1 g/dl (gram/deciliter) in toluene solution. Viscosities are determined at 25° C. and results interpolated to 300 sec$^{-1}$. It is also preferred that the alphaolefin polymer can be formed from a predominately high molecular weight monomer having at least 6 carbon atoms such that at least 60 weight percent of the polymer is formed from monomers having 8 carbon atoms or more.

The use of alphaolefin polymers is simply preferred and is not critical to the present invention. Other polymers suitable for reducing drag in hydrocarbon liquids non-exhaustively include polyalkene oxides, butylene oxide and copolymers of butylene oxide and vicinal oxides, such as styrene/vinyl pyridine copolymers and randomly sulfonated ethylene/propylene diene copolymers.

The present invention is more effective as nozzle opening size is reduced. However, reduction in nozzle opening size also limits the amount of polymeric drag reducer which can be introduced into a conduit containing flowing liquid. It is preferred that the nozzles have openings no greater than 1 millimeter in its largest dimension be used. Depending upon the pipeline flow fluid characteristics and the like, even smaller nozzle openings can be used.

When the flowing liquid is an aqueous liquid, the present invention can be used with polymers which are effective in reducing drag in these liquids. Representative but non-exhaustive examples of such polymers are guar gums, polysaccarides, polyacrylamides, and polyethylene oxide.

The present invention is more concretely described with reference to the examples below, wherein all parts and percentages are by weight unless otherwise specified. The examples are provided to illustrate the present invention and not to limit it.

EXAMPLE 1

The invention was demonstrated by injection of a drag reducing material (CDR Flow Improver - Trademark of and sold by Conoco Specialty Products, Inc.) into a 2-inch flow loop flowing No. 2 diesel oil. Test conditions were:

| | |
|---|---|
| Diesel Flowrate: | 60 gal per minute |
| Loop Velocity: | 6.52 ft/sec |
| Diesel Temperature: | 73° F. (±1° F.) |
| Diesel Viscosity: | 4 centistokes |
| Concentration: | 7.37 wt. % polymer |
| Pipe Inside Diameter: | 1.939 in. |

The test loop was composed of five measuring segments, each with a length of 86 feet. The injection point was 63 feet before the first segment. Dissolution rate was monitored by comparing drag reduction results in each segment. Systems giving faster dissolution show higher drag reduction in the beginning segments.

The injection nozzle used to demonstrate the present invention was fabricated by attaching a fine mesh screen to a 2-inch port. The port was essentially a simple "tee" fitting.

Using the drag reducing product, a predissolved solution of drag reducing material in diesel oil was prepared. This predissolved solution was used to demonstrate the effectiveness of the polymer in a full dissolution regime. Also compared to the present invention were conventional injection techniques using a standard multi-opening die wherein the opening produced a strand initially about ⅛ of an inch in diameter. The present invention was demonstrated using a 40 U.S. standard mesh having approximately 0.015 inch openings. The injection rate varied between about 6 and 24 cubic centimeters per minute.

Table 1 shows the comparative drag reduction results for the present invention, a multi-perforated nozzle having openings of approximately ⅛ inch in diameter and for a predissolved solution of the same drag reducing material. The predissolved solution clearly shows the performance expected if full dissolution occurs. It is apparent that the present invention provides much more efficient dissolution results. Dissolution appears to reach a maximum value by the second segment using the present invention while conventional injection techniques require about 4 segments. Of even greater significance is the amount of material which never dissolves using conventional techniques. This material can be observed by a segment-by-segment comparison of the data. It is clear that in all cases the drag reduction reaches a maximum and then drops in subsequent segments. This drop is caused by a small amount of shear degradation of the dissolved polymer. The degradation is offset in earlier segments by dissolution which releases more polymer to generate drag reduction. A characteristic segment-by-segment profile is shown in FIG. 1. In FIG. 1, Region A is dominated by dissolution, while Region B shows a dissolution rate balancing the degradation rate and in Region C the degradation rate dominates.

EXAMPLE 2

Using the procedure of Example 1, different levels of drag reducer concentrations were utilized to demonstrate the two inventions. The results are set forth in Table 1, which show that conventional injection results in a significant portion of the material not dissolving demonstrating that the present invention not only provides faster dissolution but much more complete dissolution of the drag reducing polymer.

TABLE 1

| Segment | Full Dissolution | Conventional Injection | Improved Injection |
|---|---|---|---|
| | % Drag Reduction - 100 ppm Injection | | |
| 1 | 68.0 | 38.3 | 56.2 |
| 2 | 67.5 | 47.7 | 61.0 |
| 3 | 67.0 | 48.5 | 62.0 |
| 4 | 66.5 | 50.9 | 62.1 |
| 5 | 66.0 | 50.2 | 61.2 |
| | % Drag Reduction - 26 ppm Injection | | |
| 1 | 53.8 | 26.5 | 44.9 |
| 2 | 51.4 | 30.4 | 45.8 |
| 3 | 48.8 | 33.4 | 42.5 |
| 4 | 45.7 | 34.3 | 39.5 |
| 5 | 43.0 | 30.8 | 36.9 |

We have found the drag reduction and concentration of additives in the flowing fluid are not linearly correlated. The relationship of effectiveness and concentration is shown in FIG. 4 which shows the correlation and also shows the very strong saturating effect at higher treatment levels. FIG. 4 shows four actual data points obtained using the same product used to test the present invention and superimposes these data points over a predicted performance curve obtained by statistical extrapolation and smoothing of the data points. The FIG. 4 curve shows it is possible to estimate the total active concentration of additive in various segments by correlating observed drag reduction with concentration. The technique is not totally accurate in that it slightly underestimates total dissolved polymer since degradation effects are not included.

Dissolution effects are shown in Table 2 and FIGS. 5 and 6. It is seen from Table 2 that at 100 ppm injection levels, the amount of polymer dissolved using the present invention is approximately twice that of conventional technology. At 26 parts per million (ppm) injection level, the early segments show more than twice as much polymer dissolved by the present invention. The data of segments 3 through 5 reflects the degradation of the polymer which lowers the calculated amount of polymer dissolved. It is clear that the injection method of the present invention clearly achieves maximum dissolution sooner and with greater effectiveness than the methods of the prior art.

TABLE 2

| Segment | Conventional Injection | Improved Injection |
|---|---|---|
| | % Dissolution - 100 ppm Injection | |
| 1 | 13 | 28 |
| 2 | 19 | 37 |
| 3 | 20 | 40 |
| 4 | 22 | 40 |
| 5 | 22 | 37 |
| | % Dissolution - 26 ppm Injection | |
| 1 | 28.5 | 65.4 |
| 2 | 34.6 | 69.2 |
| 3 | 40.0 | 57.7 |
| 4 | 41.5 | 53.1 |
| 5 | 35.4 | 46.9 |

While the present invention has been described as being effective for drag reduction phenomenon, the other uses for such high molecular weight viscoelastic polymers all benefit from faster, more efficient dissolution of such concentrates. Such applications include jet fuel flammability control or anti-misting, textile lubricant additives, pour point depressants, and polymer blending additives.

While certain embodiments and details have been shown for the purpose of illustrating the present invention, it will be apparent to those skilled in this art that various changes and modifications may be made herein without departing from the spirit or scope of the invention.

We claim:

1. A method for increasing the effectiveness of a drag reducing polymer in reducing the friction loss of flowing liquids through conduits, comprising injecting a drag reducing polymer solution through multiple orifices no larger than 2 millimeters in the largest dimension and allowing the flowing liquid moving past the extruded polymer to dissolve said polymer, wherein the injection rate is such that substantially no reagglomeration occurs on the flowing liquid/conduit side of the orifices prior to dissolution by the flowing liquid and such that the polymer concentrate forms very small filaments of diameter less than 2 millimeters and length less than about 10 meters prior to dissolution.

2. A method as described in claim 1 wherein the drag reducing polymer is a hydrocarbon soluble polymer and the flowing liquid is a hydrocarbon liquid.

3. A method as described in claim 2 wherein the drag reducing polymer is substantially an olefin polymer having an inherent viscosity of at least 11 deciliters per gram.

4. A method as described in claim 3 wherein the olefin-polymer contains at least 60 percent by weight olefinic monomers having at least 6 carbon atoms.

5. A method as described in claim 3 wherein the orifices are provided by a mesh having openings no larger than 1 millimeter in the largest dimension.

6. A method as described in claim 1 wherein the drag reducing polymer is a water-soluble polymer and the flowing liquid is an aqueous fluid.

7. A method as described in claim 1 wherein the high molecular weight polymer is used as a jet fuel anti-mist additive and the flowing liquid is jet fuel.

8. A method as described in claim 1 wherein the high molecular weight polymer is substantially an alphaolefin polymer and the flowing liquid is petroleum oil.

* * * * *